United States Patent [19]
Lethen

[11] 3,811,001
[45] May 14, 1974

[54] TILTABLE INDUCTION FURNACE FOR MOLTEN METALS

[75] Inventor: Robert Lethen, Lammersdorf, near Aachen, Germany

[73] Assignee: Otto Junker GmbH, Lammersdorf, near Aachen, Germany

[22] Filed: Sept. 5, 1973

[21] Appl. No.: 394,450

[30] Foreign Application Priority Data
Sept. 6, 1972 Germany.......................... 2243757

[52] U.S. Cl. .................................................. 13/27
[51] Int. Cl. ............................................ H05b 5/00
[58] Field of Search............................ 13/26, 27, 10

[56] References Cited
UNITED STATES PATENTS
3,347,972  10/1967  Renkey.............................. 13/26 X
3,463,864  8/1969  Tama.................................... 13/27

Primary Examiner—Roy N. Envall, Jr.
Attorney, Agent, or Firm—Michael S. Striker

[57] ABSTRACT

An induction furnace has a bottom wall and a circumferential side wall which extends upwardly from the bottom wall. The side wall surrounds a chamber the inner diameter of which is at least equal to the height of the side wall. Water-cooled induction coil is concentric with the side wall and extends upwardly from the region of the bottom wall by a distance which is at most equal to one quarter of the height of the side wall. Magnetic yokes are provided on the outer circumference of the coil and cover at least two thirds of the outer circumference. Thermally insulating material exteriorly surrounds the side wall upwardly of the induction coil.

12 Claims, 3 Drawing Figures

TILTABLE INDUCTION FURNACE FOR MOLTEN METALS

BACKGROUND OF THE INVENTION

The present invention relates to a tiltable induction furnace for molten metals, and in particular to such a furnace which is to be operated at mains frequency and serves for heating and maintaining hot of molten metals.

More and more, heating and maintaining hot of molten metals in casting foundries is carried out with the aid of tiltable induction furnaces in form of crucibles having high volumetric capacity. These serve in particular as a sort of buffer storage between the actual melting furnaces and the actual casting operation, to hold the metal which was molten in the melting furnaces in readiness for casting until it is required.

The power requirements for these induction furnaces, measured in kW/t, is rather low as compared to actual melting furnaces. While actual melting furnaces which are operated at mains frequency usually require of approximately 200–300 kW/t, the induction furnaces of the type in question wherein the metal is merely to be maintained at casting temperatures, have power requirements of only approximately 20 – 30 kW/t.

As already suggested above, the heating of these furnaces is usually carried out inductively by means of so-called ring inductors which are connected to the body of the furnace by means of appropriate flanges. The main advantages of this arrangement are that the dimensioning and structural configuration of the actual furnace or crucible body can be carried out in accordance with the particular requirements of their application, and without having to pay special attention to the incorporation of the inductor, since the latter can be subsequently connected to the furnace or crucible by the aforementioned flanges.

The molten metal is made to pass within an annular chamber around an induction coil having a transformer core. Because of this the ring conductors have a high electrical effectiveness of approximately 0.9 – 0.95 and a relatively advantageous output factor of up to approximately $\cos \phi$ 0.7. On the other hand, they have disadvantages which mainly result from the fact that the annular channel which extends around the induction coil must be relatively narrow in order to assure that the molten metal which is in it will be properly heated. The major disadvantage results from the fact that in the region of this channel there will be a higher temperature than in the interior of the furnace chamber, and that this results in an increased wear of the ceramic lining material. For this reason, it is necessary to relatively frequently replace the ring inductor which is connected with such furnaces. While such replacement is relatively simple, because the ceramic lining can be separated in the region of the flange connection by including a thin intermediate layer, the connection and disconnection, especially of larger-diameter inductors, must be carried out very carefully and requires especially trained personnel, for which reason it is evidently expensive. One of the problems is of course that the otherwise continuous ceramic lining of the furnace chamber must be interrupted at the point where the flange connection is established, in order to provide a connection of the openings of the annular channels of the inductor. Because this so-called inductor-neck, that is the junction between the ring inductor and the interior of the furnace chamber means a weakening in the mechanical strength of the ceramic lining, and because on the other hand, the heat produced in the inductor channels must be transmitted to the bath of molten metal in the furnace chamber, the ceramic material in this area is frequently worn very rapidly which could lead to shutting-down of the furnace. These disadvantages which result from the principle of using a ring inductor are particularly troublesome when increased requirements are made of the induction furnace, that is if for instance, the metal required to be at casting temperatures in excess of 1,500° C., if additional metallurgical treatment is to be carried out in the furnace (for instance chlorinating of light-metal alloys), and also if the type of molten metal is to be changed frequently.

Various attempts have been made to overcome these problems, and to replace the ring inductors with so-called crucible inductors. This avoids the narrow annular channels of the ring inductors, but not the difficulties which result from having to connect the inductor to the actual furnace body by means of flanges.

It is known to avoid the last-mentioned disadvantages by using inductively heated crucible furnaces of the type which is in principle used as melting furnaces. However, when they are used for merely maintaining the molten metal at casting temperature, the amount of energy required for operating these furnaces is uneconomically high because this type of furnace uses a relatively large amount of energy merely for the purpose of maintaining the furnace at the necessary temperature and in thermal balance. Moreover, this type of furnace is not really suitable for maintaining the molten metal in readiness for casting because in the interest of good energy utilization they are so constructed as to have relatively high furnace bodies and relatively high inductive coils, that is the height is relatively great as compared to their diameter. This construction, however, makes it impossible to employ the so-called "siphon principle" which is preferred in the type of furnace in question, that is furnaces which maintain the metal at casting temperature for metallurgical reason, to fill and empty the furnace. This principle uses a spout which is located as far as possible within the furnace wall and is enclosed as much as possible and having an upper outlet which is located approximately at the level of the upper end of the circumferential wall of the furnace. The utilization of the "siphon principle" is of importance, because in the type of furnace which maintains the molten metal at requisite temperature for casting it is necessary that frequently small amounts of the molten metal be capable of being withdrawn from the very large capacity of metal in the furnace and that this withdrawal should be carried out with a minimum tilting of the furnace. Particularly in modern foundries it is desirable to have these temperature-holding furnaces provided with a very large volumetric capacity up to and even in excess of 20 tons of molten metal, including molten aluminum. Induction-type crucible furnaces which are usually used for the actual melting of the metal, are not really suitable for this prupose because the height of their furnace bodies is great with respect to their diameter and the same is true of the inductive coils, and in this type of construction, the "siphon principle" cannot be utilized.

SUMMARY OF THE INVENTION

It is, accordingly, an object of the present invention to overcome the disadvantages of the prior art.

More particularly, it is an object of the present invention to provide an improved tiltable induction furnace for molten metals which avoids the disadvantages of the prior art.

Another object of the invention is to provide such an induction furnace which is principally different from the type of furnaces used heretofore for maintaining molten metal at casting temperature, including the inductiontype crucible furnaces which are inherently intended for melting purposes but have on occasion been used for maintaining molten metal at casting temperatures.

With the above objects and others which will become apparent hereafter, one feature of the invention resides in a tiltable induction furnace which, briefly stated, comprises wall means including a bottom wall and a circumferential side wall extending upwardly from the bottom wall. The side wall surrounds the chamber whose inner diameter is at least equal to the height of the side wall. A water-cooled induction coil is concentric with the side wall and extends upwardly from the region of the bottom wall by a distance which is at most equal to one quarter of the height of the side wall. Magnetic yokes are provided on the outer circumference of the coil and cover at least two thirds of the outer circumference; these yokes complete the magnetic circuit. Thermally insulating means exteriorly surrounds the side wall upwardly of the induction coil where the side wall is not cooled.

I have found that the combination of the aforementioned features provides an induction furnace which is particularly suited for the specific requirements made in foundries where this type of furnace is to maintain molten metal at casting temperature. Even if the furnace is so constructed as to have a very large volumetric capacity, it can be so mounted that even with small tilting angles any desired amount of metal can be withdrawn from it for casting purposes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
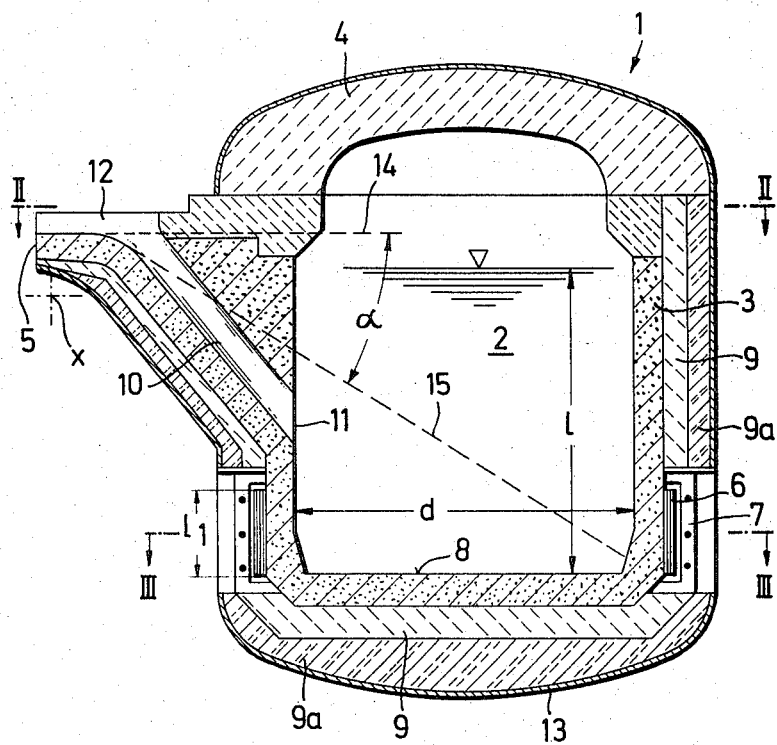
FIG. 1 is a somewhat diagrammatic axial section through a furnace according to the present invention.
Figure 2:
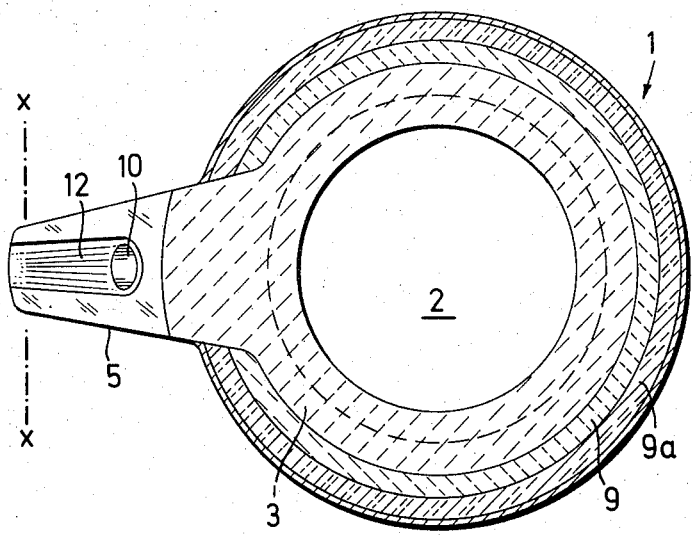
FIG. 2 is a section taken on line II—II of FIG. 1.
Figure 3:
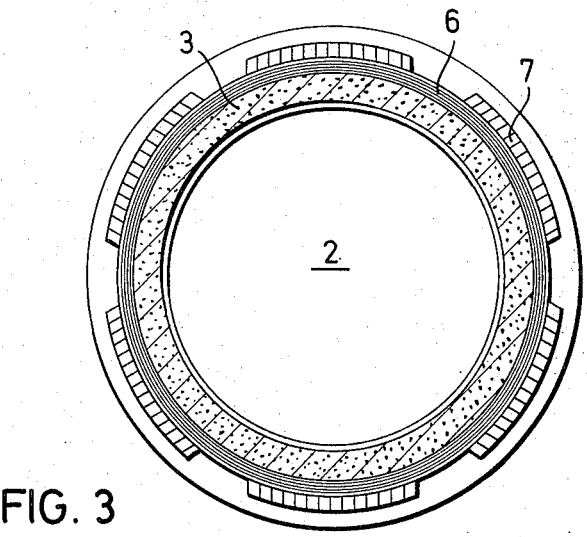
FIG. 3 is a section taken on line III—III of FIG. 1.

Discussing the drawing now in detail it will be seen that FIGS. 1 – 3 show a single exemplary embodiment of my novel furnace. The furnace is designated in toto with reference numeral 1. The crucible within the furnace and which accommodates the bath of molten metal 2, is designated with reference numeral 3. The upper open end of the furnace 1 is closed by a heat-resistant cover 4. The furnace has a radially projecting casting spout 5. A water-cooled induction coil 6 is provided, concentric with the side wall of the furnace and exteriorly the coil is surrounded by magnetic yokes 7 which complete the magnetic circuit on the outside.

The crucible 3, which of course forms a part of the furnace 1, is of a compacted ceramic material, which is resistant to heat and to damage from the molten metal. At the outside, in the uncooled region, upwardly of the coil 6, and also in the region of the bottom wall 8, the crucible 3 is surrounded by wall 9, of firebrick or the like, exteriorly thereof there is again provided another wall or layer 9a located upwardly of the coil 6 and having heatinsulating properties. Materials for this wall 9a are well known in the art, and may include lightweight firebrick.

Below the spout 5 the material of the crucible 3 is formed with a circumferentially closed straight casting channel 10 in this embodiment of circular cross-section. It has an inlet 11 directly above the coil 6, and its outlet communicates with an upwardly opened trough 12 which is also formed in the material of the crucible 3 and has a horizontal orientation, being located approximately at the level of the upper end of the crucible 3.

The magnetic yokes 7 are substantially U-shaped in configuration and surround the exterior of the inductive coil 6 which is water-cooled. FIG. 3 shows that the yokes 7 are so distributed over the circumference of the coil 6 that more than two thirds of this circumference is surrounded by the yoke.

FIG. 1 shows that the axial length of the coil 6, identified with character $L_1$, is less than one quarter of the overall height of the circumferential side wall of the crucible 3. The height or axial length L of the side wall of the crucible 3 in turn is smaller than the inner diameter of the chamber which is surrounded by the side wall, that is the ratio of L : $d$ is 0.8:1.

The tilting axis about which the furnace 1 can be tilted to pour molten metal out of the spout 5 is only diagrammatically illustrated and designated with reference character X. The angle $\alpha$ designates the tilting angle which is encountered in the normal casting operation, that is when the furnace 1 is tilted about the axis X to pour molten metal out of the spout 5. This tilting angle is included between a horizontal 14 which passes through the trough 12 at the spout 5, and and inclined plane 15 which passes through the curved zone in which the channel 10 merges into the trough 12 and through the juncture between the bottom wall 8 and the circumferential side wall of the crucible 3, at the side of the chamber which is opposite the side where the spout 5 is located. This tilting angle $\alpha$ is only approximately 30 percent but could be as high as 40 percent, and it includes all angles to which the furnace 1 must be tilted in normal casting operation (except if the furnace is to be totally emptied of molten metal) to pour molten metal out of the furnace for casting purposes.

Reference numeral 13 designates an outer steel casing which surrounds the furnace 1 and the cover 4 thereof in their entirety.

This construction is highly advantageous for the purposes intended, namely the maintenance of molten metal at casting temperature. The furnace is relatively stout, that is it is relatively low with respect to its transverse dimension $d$, and one of the advantages resultant from this is that stresses acting on the crucible 3, resulting from temperature fluctuations and the expansions and contractions of the ceramic material which are caused by the same, are reduced to such an extent that at the particularly critical juncture between the portion of the circumferential wall which is cooled by the water cooling for the coils 6 and the portion which is uncooled, no cracks or other damage will develop. Moreover, the particular height chosen for the coil 6 in conjunction with the particularly densely arranged magnetic yokes 7, and a good heat insulation of the portion which is not surrounded by the coil 6, assure a minimum of energy loss, that is of the energy required for maintaining the molten metal 2 at casting temperature. Quite surprisingly, it has been found that axial length $L_1$ of the coil 6 which are outside the range chosen in accordance with the present invention, cause substantially higher energy losses. By contrast, the energy losses resulting from the maintenance of the thermal equilibrium of the oven are only half as great in the oven according to the present invention than in conventional crucible furnaces which are used for melting purposes. This, therefore, results in a substantial reduction of the energy requirements of the furnace.

It might be theorized that the reduction of the axial length of the coil 6 could suggest itself because the electrical energy requirements are therefore reduced and become largely dependent upon any fluctuations of the metal bath. However, inherently this has the disadvantage that the electrical effectiveness of the furnace normally decreases as the axial length of the coil is reduced. Surprisingly, however, I have found that these disadvantages can be reduced by reducing the heat losses in that I provide the heat insulation 9a and by my provision of the much more effective magnetic yokes 7, so that these disadvantages are more than compensated for by these two measures and by the fact that the energy losses due to maintenance of the thermal equilibrium are reduced with the reduction of the axial length of the coil 6.

Surprisingly I have found that these energy losses due to maintenance of the thermal equilibrium, a value which can be defined as the quotient of heat losses and the electrical effectiveness, that is as a function of the length of the coil, will be the less, the shorter the axial length of the coil will be, up to a lower limit of approximately ⅛th of the length of the circumferential side wall of the crucible 3. Moreover, the low axial length of the coil 6 not only facilitates the maintenance of an advantageous geometrical relationship between the height of the side wall of the crucible 3 and the diameter $d$, but in fact makes this relationship possible in the first place. This means that for filling and withdrawal of liquid metal, that is operations which in the case of a temperature maintaining furnace in a foundry take place constantly, only very small tilting movements of the furnace are required. Moreover the "siphon principle" discussed earlier can be readily utilized and the static pressure of the molten metal in the lower part of the crucible 3 is reduced. Finally, due to the substantial reduction in the height of the crucible, as compared with the diameter, damage and destruction of the ceramic material of the crucible 3 due to alternate expansion and contraction is significantly reduced.

By comparison with temperature-maintaining furnaces of the type using ring inductors which are connected to the actual furnace body by flanges, the construction according to the present invention has the substantial advantage that there is no more temperature gradient in the molten metal bath 2, which makes the temperature of the bath controllable and supervision much more effective. The permissible temperature limit is much higher in the furnace according to the present invention, and the chamber of circular cross section can be much more readily cleaned than what is possible in the prior art. The ceramic lining, that is the material of the crucible 3, can be repaired and inspected much more simply and readily and can be replaced more frequently. Moreover, the power supply in $kW/t$ can be readily increased, if necessary, without having to resort to any significant changes in the construction.

The coil 6 is advantageously capacitively balanced with respect to its load. Because of its low axial height it is not electrically subdivided and can, in known manner, advantageously be connected to only one phase of a three-phase power supply. To obtain a symmetric load-distribution within the three phases, an inductive reactor load is connected with the second phase and a capacitive reactor load is connected with the third phase. This does, admittedly, require a somewhat more complicated construction and in particular it requires more capacitors and more switching arrangements. On the other hand, the electrical effectiveness is so increased that this disadvantage is fully compensated.

However, this type of arrangement can be eliminated in many instances, because the energy requirement for a furnace of the type in question that is which merely maintains the molten liquid at the casting temperature as opposed to the type wherein metal has to be melted in the first place, depends predominantly upon the amount of heat loss due to the large volumetric capacity and the low amount of power that is being drawn by this type of furnace. Due to the combination of features which have been outlined above in keeping with the present invention, this heat loss is low and therefore advantageous in magnitude.

Another advantage of the construction according to the present invention is the fact that the channel 10 can be utilized permitting the furnace to operate on the aforementioned "siphon principle," which is particularly advantageous in furnaces having large volumetric capacity and serving for maintaining molten metal at casting temperature for casting operations.

The channel 10 is advantageously inclined to the horizontal at an angle of between 40° and 60°, preferably 50°, in order to obtain the advantageous angle $\alpha$. The advantage is further increased by the fact that the inlet 11 of the channel 10 is located almost directly adjacent the upper end of the coil 6.

It will be understood that each of the elements described above, or two or more together, may also find a useful application in other types of constructions differing from the types described above.

While the invention has been illustrated and described as embodied in a tiltable induction furnace for molten metals, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a tiltable induction furnace for molten metals, a combination comprising wall means, including a bottom wall and a circumferential side wall extending upwardly from said bottom wall, said side wall surrounding a chamber whose inner diameter is at least equal to the height of said side wall; a water-cooled induction coil concentric with said side wall and extending upwardly from the region of said bottom wall by a distance which is at most equal to one quarter of said height of said side wall; magnetic yokes provided on the outer circumference of said coil and covering at least two thirds of said outer circumference; and thermally insulating means exteriorly surrounding said side wall upwardly of said induction coil.

2. A combination as defined in claim 1, wherein said height of said side wall is equal to substantially 0.8 times said inner diameter.

3. A combination as defined in claim 1, wherein said distance of said coil is equal to between substantially one-fifth and one-eighth of said height of said side wall.

4. A combination as defined in claim 1, said coil being electrically undivided and connected to a single phase of a three-phase current supply, and capacitive reactive loads connected with the second and third phase of said supply for obtaining symmetrical load distribution to the three phases.

5. A combination as defined in claim 1, said side wall having an upper open end provided with a pouring spout; and a cover closing said open end.

6. A combination as defined in claim 5, wherein said pouring spout projects radially outwardly beyond said side wall and upper open end, and having an inlet and an outlet; and further comprising a circumferentially closed channel formed in said side wall at an angle to said bottom wall and connecting said inlet with said chamber.

7. A combination as defined in claim 6, wherein said upper open end is surrounded by an at least substantially horizontal open trough, said spout merging with said trough and projecting radially from said side wall by a distance which is equal to at least about one-third of said inner diameter.

8. A combination as defined in claim 7, wherein said bottom wall is substantially horizontal when said furnace is in upright position; and wherein said channel is inclined to said bottom wall at an angle of between 40°–60°.

9. A combination as defined in claim 8, wherein said angle is 50°.

10. A combination as defined in claim 6, wherein said channel is straight and has an open inlet end communicating with said chamber only slightly above an upper end of said induction coil.

11. A combination as defined in claim 6, wherein said furnace is so journalled for tilting movement that when it is tilted for casting of molten metal from it, a tilting angle included between a horizontal plane passing through an upper outlet end of said channel at one side of the chamber, and an inclined plane passing through said upper outlet end and a juncture between said bottom and side walls at the opposite side of said chamber, has a magnitude of at most 40°.

12. A combination as defined in claim 11, wherein the magnitude of said angle is substantially 30°.

* * * * *